Figure 1:
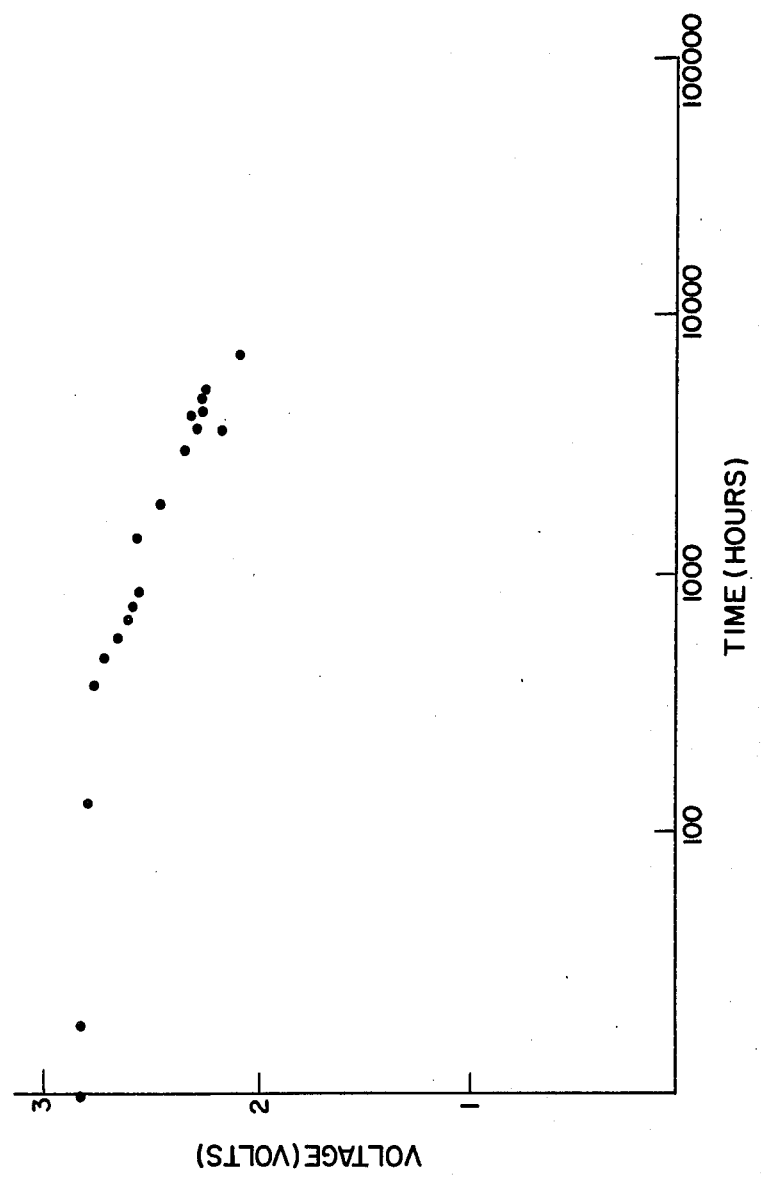

United States Patent [19]

Louzos et al.

[11] 4,263,382
[45] Apr. 21, 1981

[54] CHARGE TRANSFER COMPLEX CATHODES FOR SOLID ELECTROLYTE CELLS

[75] Inventors: Demetrios V. Louzos, Rocky River; Harry Vourlis, Lakewood, both of Ohio

[73] Assignee: Union Carbide Corporation, New York, N.Y.

[21] Appl. No.: 134,866

[22] Filed: Mar. 28, 1980

[51] Int. Cl.³ ............................................. H01M 4/36
[52] U.S. Cl. ................................... 429/213; 429/191; 429/199; 429/218
[58] Field of Search ............... 429/213, 212, 191, 199, 429/218, 101, 105; 252/182.1

[56] References Cited

U.S. PATENT DOCUMENTS

| | | | |
|---|---|---|---|
| 3,352,720 | 11/1967 | Wilson et al. | 429/213 |
| 3,660,163 | 5/1972 | Moser | 429/213 X |
| 3,660,164 | 5/1972 | Hermann et al. | 429/213 X |
| 4,049,890 | 9/1977 | Schneider | 429/199 X |

Primary Examiner—Anthony Skapars
Attorney, Agent, or Firm—Cornelius F. O'Brien

[57] ABSTRACT

Charge transfer complex cathodes for use in solid state cell systems wherein the cathodes are the reaction products of at least one halogen such as iodine or bromine with poly(N-vinylpyrrolidone).

11 Claims, 2 Drawing Figures

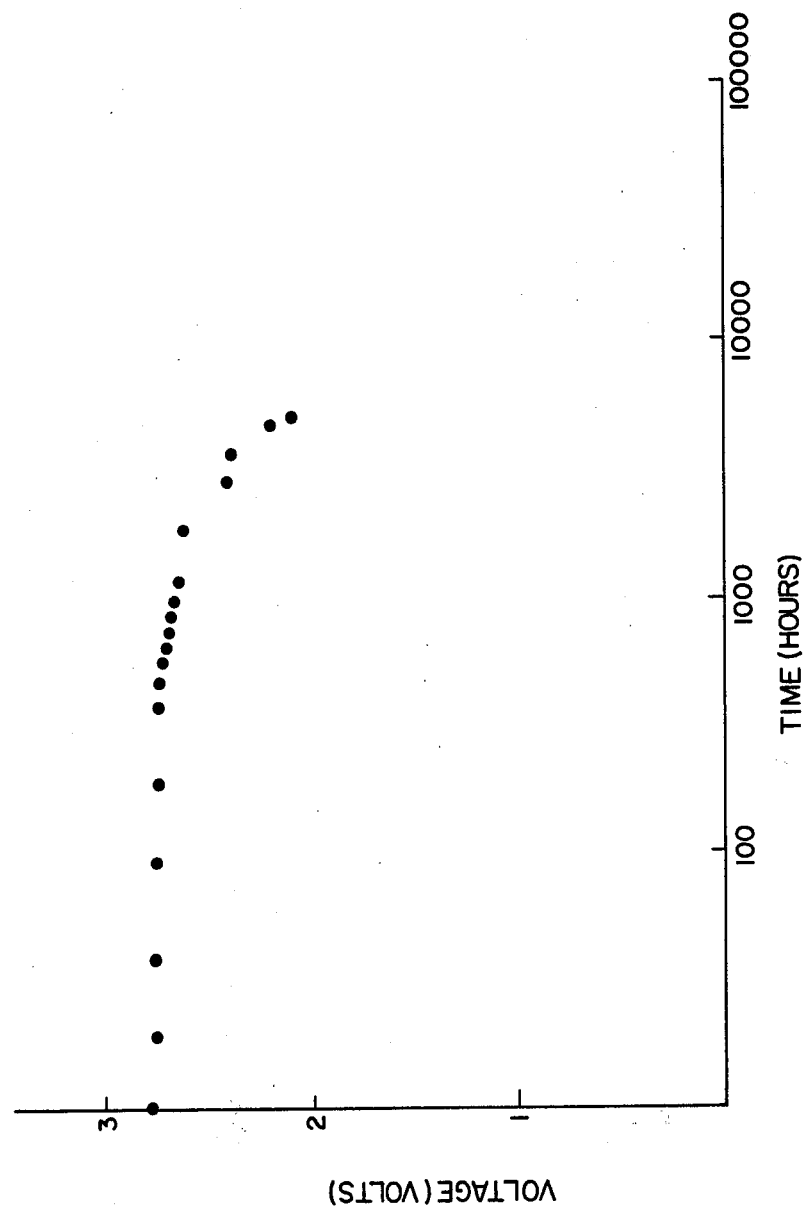

CHARGE TRANSFER COMPLEX CATHODES FOR SOLID ELECTROLYTE CELLS

FIELD OF THE INVENTION

The invention relates to a cathode for use, primarily, in solid state cell systems and wherein the cathode comprises a charge transfer complex in which the complex is the reaction product of at least one halogen with poly(N-vinylpyrrolidone).

BACKGROUND OF THE INVENTION

Ionic conductivity is usually associated with the flow of ions through an aqueous solution of metallic salts. In the vast majority of practical uses of ionic conductors, e.g., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have ionic conductances approaching those exhibited by the commonly used liquid systems. Such compounds have specific conductances at room temperature (20° C.) in the range of $10^{-6}$ to $10^{-15}$ ohm$^{-1}$ cm$^{-1}$ as compared to aqueous solutions of salts which typically have a specific conductance of 0.5 to 0.05 ohm$^{-1}$ cm$^{-1}$.

Improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid electrolyte power sources.

Gutman et al, J. Electrochem. Soc., 114, 323 (1967) discloses solid state cells utilizing cathodes of electronically conducting charge transfer complexes and anodes of selected divalent metals. U.S. Pat. No. 3,660,163 discloses solid state lithium-iodine primary cells employing a lithium anode, a solid state lithium halide electrolyte and a conductive cathode of organic materials, such as polycyclic aromatic compounds, organic polymers, heterocyclic nitrogen-containing compounds, and the like, and iodine. U.S. Pat. No. 3,660,164 discloses solid state cells utilizing as a cathode a charge transfer complex in which the acceptor component is the halogen and the donor component is an organic compound, typically aromatic or heterocyclic.

U.S. patent application Ser. No. 052,846 filed June 28, 1979 discloses a charge transfer complex cathode which is the reaction product of a halogen with carbonaceous pitch, such as mesophase pitch.

Although various cathode materials have been recited in the art for use in various cell systems, an object of the present invention is to provide a novel cathode for use in solid electrolyte cell systems.

Another object of the present invention is to provide a cathode comprising a charge transfer complex in which the complex is the reaction product of at least one halogen with poly(N-vinylpyrrolidone).

Another object of the present invention is to provide a cathode comprising a charge transfer complex in which the complex is the reaction product of iodine or bromine with poly(N-vinylpyrrolidone).

Another object of the present invention is to provide a cathode comprising a charge transfer complex in which the complex is the reaction product of iodine with poly(N-vinylpyrrolidone) for use in a solid state cell employing a lithium anode and a solid lithium iodide electrolyte.

The foregoing and additional objects will become more fully apparent from the following description.

SUMMARY OF THE INVENTION

The invention relates to a cathode for use in an electrochemical cell comprising a charge transfer complex in which the complex is the reaction product of at least one halogen with poly(N-vinylpyrrolidone) and wherein the donor component is the poly(N-vinylpyrrolidone) and the acceptor component is the at least one halogen.

As used herein, at least one halogen shall mean a halogen such as iodine, bromine, chlorine or fluorine, a mixture of two or more halogens or a compound (interhalogen) of two or more halogens.

Charge transfer complexes are a well-known class of materials that have two components—one as an electron donor, the other as an electron acceptor—that form weakly bonded complexes that exhibit electronic conductivity higher than either component. Charge transfer complexes for this invention comprise a poly(N-vinylpyrrolidone) as the electron donor and at least one halogen as the electron acceptor. The preferred charge transfer complexes of this invention would be the reaction product of a poly(N-vinylpyrrolidone) with iodine or bromine. Although the conductivity of the charge transfer complexes of this invention will be sufficiently high for most cell applications, the conductivity could be made higher by adding a conductive material such as carbon, graphite or a metal which is chemically inert in the cell environment. Preferably, the specific conductance of the charge transfer complexes for most cell applications should be greater than about $10^{-6}$ ohm$^{-1}$ cm$^{-1}$.

The preferred charge transfer complex cathodes of this invention are represented by the following structural formula:

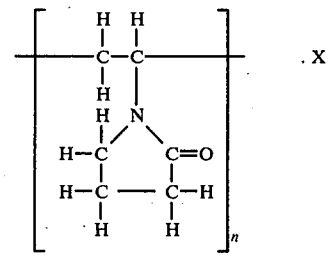

where X=iodine or bromine.

Preferably the acceptor component such as iodine or bromine should range between about 50 percent to about 97 percent by weight of the total charge transfer complex and most preferably between about 80 percent and 90 percent by weight.

Anode materials suitable for use with the cathodes of this invention include lithium, silver, sodium, potassium, rubidium, magnesium and calcium. The preferred anode material is lithium.

Solid electrolytes for use in this invention would include lithium iodide, silver iodide, silver bromide, lithium bromide, tetrasilver rubidium pentaiodide, lithium aluminum tetrachloride, tetrasilver potassium tetraiodide cyanide, tetrasilver rubidium tetraiodide cyanide, sodium iodide and sodium bromide. The preferred solid electrolytes for use in this invention are lithium iodide and tetrasilver potassium tetraiodide cyanide.

As disclosed in U.S. Pat. No. 3,660,163, in a lithium anode cell, lithium iodide can be formed in situ by contacting the lithium anode with the iodine-containing cathode surface whereupon the lithium will react with the iodine in the cathode to form a lithium iodide electrolyte layer that will contact both the anode and the cathode. Alternately, the lithium iodide could be formed by reacting lithium and iodine and then applying the lithium iodide as a coating on the surface of the anode or cathode.

Preferable cell systems using the cathode of this invention would be as follows:

| Anode | Electrolyte |
| --- | --- |
| lithium | lithium iodide |
| lithium | lithium bromide |
| silver | silver iodide |
| silver | tetrasilver potassium tetraiodide cyanide |
| silver | tetrasilver rubidium tetraiodide cyanide |

Poly(N-vinylpyrrolidone) is a whitish material and has a specific conductance of less than $10^{-8}$ ohm$^{-1}$ cm$^{-1}$. Iodine has a violet color and has a specific conductance of only $1.7 \times 10^{-7}$ ohm$^{-1}$ cm$^{-1}$. However, in contrast, the poly(N-vinylpyrrolidone).$I_2$ reaction product is black and is considerably more conductive by a factor of several orders of magnitude.

DRAWINGS

FIGS. 1 and 2 are discharge data of solid electrolyte cells employing the charge transfer complex cathodes of this invention as described in Examples 2 and 3, respectively.

EXAMPLE 1

Various weight ratios of poly(N-vinylpyrrolidone) (PVP), which was obtained from GAF Corporation as K90, were intimately ground blended with powdered resublimed iodine which was obtained from Baker Chemical Co. The blends so obtained were sealed in evacuated tubes after each had been independently dried over $P_2O_5$ for at least one week. Some of the PVP.$I_2$ blends were reacted at 200° C. for 16 hours (Table I) and some were reacted at 115° C. for 16 hours (Table II). The weight ratios of the various PVP.$I_2$ blends along with their physical characteristics and specific conductance at room temperature are shown in Tables I and II.

TABLE I

| Weight Ratio* | Physical Characteristic | Spec. Cond. (ohm$^{-1}$ cm$^{-1}$) |
| --- | --- | --- |
| 20% PVP . 80% $I_2$ | Black Solid | $7 \times 10^{-4}$ |
| 9.1% PVP . 90.9% $I_2$ | Thick Black Liquid | |
| 5% PVP . 95% $I_2$ | Gummy Black Tar | |

*Reacted at 200° C. for 16 hours

TABLE II

| Weight Ratio* | Physical Characteristic | Spec. Cond. (ohm$^{-1}$ cm$^{-1}$) |
| --- | --- | --- |
| 20% PVP . 80% $I_2$ | Black Solid | $2 \times 10^{-4}$ |
| 14.3% PVP . 85.7% $I_2$ | Black Solid | $8 \times 10^{-5}$ |
| 11.1% PVP . 88.9% $I_2$ | Black Solid | $6 \times 10^{-5}$ |
| 9.1% PVP . 90.9% $I_2$ | Black Solid | $4 \times 10^{-5}$ |

*Reacted at 115° C. for 16 hours

From the data shown in Tables I and II, lowering the reaction temperature to 115° C. resulted in black solids that could be molded into cathodes in which the poly(N-vinylpyrrolidone) content was as low as 9.1% by weight. It is believed that further optimization of reaction parameters may be accomplished including reactions down to room temperature and with lower molecular weight poly(N-vinylpyrrolidone) than the one employed which had a molecular weight of about 400,000.

EXAMPLE 2

A 0.457-inch diameter button cell was constructed as follows. A poly(N-vinylpyrrolidone) iodine charge transfer complex was prepared by grinding the poly(N-vinylpyrrolidone), obtained from GAF Corporation as K90, and iodine components followed by drying them over phosphorus pentoxide for a week in an argon dry box. Thereafter the poly(N-vinylpyrrolidone) and iodine were blended together in a ratio of 20% by weight poly(N-vinylpyrrolidone) to 80% by weight of iodine and then sealed in an evacuated tube which was then heated at 200° C. for 16 hours. The resulting charge transfer complex was formed into a pellet (0.3209 gram—equivalent to 54.2 mAh) and pressed into a nickel expanded screen that had been previously spot welded to a nickel can. A lithium anode strip was placed in a cover which was then assembled along with a gasket on top of the container in a conventional manner such that the surface of the anode made contact with the surface of the cathode. The electrolyte, lithium iodide, was formed in situ by the reaction of the lithium in the anode and the iodine in the cathode. The cell was then discharged across a one megohm load and the voltages observed were recorded and are shown plotted in FIG. 1.

EXAMPLE 3

A similar cell was produced except that the charge transfer complex was tar-like and consisted of 95% iodine and 5% poly(N-vinylpyrrolidone). The pellet made from the tar-like cathode material, which weighed 0.3641 gram and was equivalent to 73 mAh, was placed into a nickel can and nickel screen assembly as discussed in Example 2 along with a lithium anode. The cell so produced was discharged across a one megohm load and the voltages observed were recorded and are shown in FIG. 2.

The data presented in FIGS. 1 and 2 clearly demonstrate the suitability of the charge transfer complex of this invention as a cathode for solid electrolyte cell systems.

It should be understood that the foregoing disclosure relates to preferred embodiments of the invention and it is intended to cover all changes and modifications of the invention which do not depart from the spirit and scope of the appended claims.

What is claimed is:

1. A cathode for use in an electrochemical cell comprising a charge transfer complex in which the complex is the reaction product of at least one halogen with a poly(N-vinylpyrrolidone) and wherein the donor component is the poly(N-vinylpyrrolidone) and the acceptor component is the at least one halogen.

2. The cathode of claim 1 wherein the charge transfer complex has the following structure:

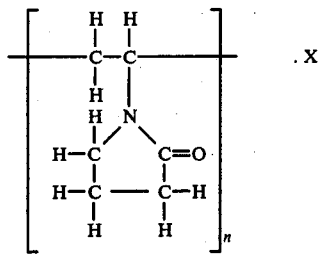

where X=iodine or bromine.

3. The cathode of claim 1 wherein the at least one halogen is selected from the group consisting of iodine and bromine.

4. The cathode of claim 1 wherein the amount of at least one halogen varies between about 50% and about 97% by weight.

5. The cathode of claim 1 wherein the at least one halogen varies between about 80% and about 90% by weight.

6. The cathode of claim 4 or 5 wherein the at least one halogen is iodine.

7. The cathode of claim 4 or 5 wherein the at least one halogen is bromine.

8. The cathode of claim 1 for use in a solid electrolyte cell employing an anode selected from the group consisting of lithium, silver, sodium, potassium, rubidium, magnesium and calcium.

9. The cathode of claim 1 or 8 for use in a solid electrolyte cell employing an electolyte selected from the group consisting of lithium iodide, tetrasilver potassium tetraiodide cyanide, lithium bromide and tetrasilver rubidium pentaiodide.

10. The cathode of claim 2 for use in a solid electrolyte cell wherein the halogen is iodine, the anode is lithium and the electrolyte is lithium iodide.

11. The cathode of claim 2 for use in a solid electrolyte cell wherein the halogen is bromine, the anode is lithium and the electrolyte is lithium bromide.

* * * * *